(12) United States Patent
Sakai et al.

(10) Patent No.: US 11,061,244 B2
(45) Date of Patent: Jul. 13, 2021

(54) COLLIMATED LIGHT GENERATING APPARATUS

(71) Applicant: MITSUBISHI ELECTRIC CORPORATION, Tokyo (JP)

(72) Inventors: Kohei Sakai, Tokyo (JP); Yukari Takada, Tokyo (JP); Fumio Shohda, Tokyo (JP); Kenichi Hirosawa, Tokyo (JP); Takayuki Yanagisawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 155 days.

(21) Appl. No.: 16/083,930

(22) PCT Filed: Apr. 28, 2016

(86) PCT No.: PCT/JP2016/063398
§ 371 (c)(1),
(2) Date: Sep. 11, 2018

(87) PCT Pub. No.: WO2017/187609
PCT Pub. Date: Nov. 2, 2017

(65) Prior Publication Data
US 2019/0391407 A1 Dec. 26, 2019

(51) Int. Cl.
*G02B 27/30* (2006.01)
*G02B 3/06* (2006.01)

(52) U.S. Cl.
CPC .............. *G02B 27/30* (2013.01); *G02B 3/06* (2013.01)

(58) Field of Classification Search
None
See application file for complete search history.

(56) References Cited

U.S. PATENT DOCUMENTS 4,323,297 A    4/1982  Kawamura et al.
4,621,892 A *  11/1986 Kataoka ............. G02B 27/0031
                                          359/210.1

(Continued)

FOREIGN PATENT DOCUMENTS

CN    103176226 A    6/2013
EP    0 617 461 A1   12/1992

(Continued)

OTHER PUBLICATIONS

International Search Report issued in PCT/JP2016/063398 dated Jul. 19, 2016.

(Continued)

*Primary Examiner* — Christopher Stanford
*Assistant Examiner* — Journey F Sumlar
(74) *Attorney, Agent, or Firm* — Birch, Stewart, Kolasch & Birch, LLP

(57) ABSTRACT

A lens (10) has an incidence surface (11) having a cylindrical shape and forming a concave shape, and an emitting surface (12) forming a convex shape with respect to an optical axis (10a). A light source (20) has a large divergence angle in a vertical direction, and a divergence angle in a horizontal direction which is smaller than that in the vertical direction. The light source (20) is located at a position of focal length of the lens (10) in the vertical direction on a side of the incidence surface. The horizontal direction of the light source (20) is aligned with a curvature direction of the cylindrical shape of the lens (10).

7 Claims, 6 Drawing Sheets

(56) References Cited

U.S. PATENT DOCUMENTS

| | | | |
|---|---|---|---|
| 5,020,888 A | 6/1991 | Ishibai et al. | |
| 5,467,335 A | 11/1995 | Braat | |
| 5,680,256 A * | 10/1997 | Katsuma | G11B 7/1374 |
| | | | 359/641 |
| 6,526,089 B1 | 2/2003 | Haeno et al. | |
| 2009/0195849 A1 * | 8/2009 | Ichii | G02B 26/124 |
| | | | 359/204.1 |
| 2016/0057397 A1 | 2/2016 | Kurosaki | |
| 2016/0327906 A1 * | 11/2016 | Futterer | G03H 1/2286 |
| 2017/0170629 A1 * | 6/2017 | Lerner | H01S 5/02326 |

FOREIGN PATENT DOCUMENTS

| | | | |
|---|---|---|---|
| JP | 55-130512 A | 10/1980 | |
| JP | 2-235010 A | 9/1990 | |
| JP | 7-72311 A | 3/1995 | |
| JP | 2725198 B2 | 12/1997 | |
| JP | 2001-100145 A | 4/2001 | |
| JP | 2002-22906 A | 1/2002 | |
| JP | 2016-452302 A | 4/2016 | |

OTHER PUBLICATIONS

Japanese Office Action issued in Japanese Patent Application No. 2016-570056, dated Jan. 31, 2017.

Siegman, "Lasers", University Science Books, Mill Valley, California, 1986, Total 18 pages.

European Office Action, dated Dec. 20, 2019, for European Apphcatton No. 16900479.3.

European Communication pursuant to Article 94(3) EPC dated Mar. 19, 2019 issued in the corresponding European Patent Application No. 16900479.3.

Office Action dated May 11, 2020 issued in the corresponding Chinese Patent Application No. 210680084699.1.

* cited by examiner

COLLIMATED LIGHT GENERATING APPARATUS

TECHNICAL FIELD

The present disclosure relates to collimated light generating apparatuses that include a light source for emitting light with asymmetric divergence angles in two axis directions within a plane perpendicular to an optical axis of the light, and a conversion optical system for reducing divergence angle of light output from the light source.

BACKGROUND ART

In recent years, light sources for high-efficiency lighting have attracted attention, and solid-state lighting products using an LED (Light Emitting Diode) or laser have been commercialized.

Because light emitted from a light source spreads as the light propagates, there is a need for reducing the divergence angle and providing an approximately collimated light in delivering the light to an intended optical system or irradiation surface. In order to cause light beam to be collimated light, a technique for collimating the light beam by using a lens and placing the light source at incidence-surface-side focal position of the lens is used widely.

Conventionally, for example, in the configuration shown in Patent Literature 1, an aspheric lens is used to make light having a large divergence angle approximately collimated by placing a light source at a focal position of the lens. An actual light source is not a point source, and has a finite size of a light emitting point. Here, divergence half-angles $\theta ho$ and $\theta vo$ after collimation in horizontal direction and in vertical direction are expressed by Equations (1) below, by using the focal length f of a lens used for collimation, and the light emission half-widths wh and wv of the light source in the horizontal direction and in the vertical direction.

$$\theta ho = \mathrm{Tan}^{-1}(wh/f)$$

$$\theta vo = \mathrm{Tan}^{-1}(wv/f) \quad (1)$$

As a result, in a case of performing collimation by using the lens having the focal length f, the divergence half-angles $\theta ho$ and $\theta vo$ after collimation increase with increase in the light emission half-widths wh and wv of the light source. Because in general, the user cannot freely change the light emitting widths of the light source, it is necessary to increase the focal length f of the lens in order to reduce the divergence angles. In this case, because the light source is located at incidence-surface-side focal position of the lens, the distance between the light source and the lens increases with increase in the focal length f.

By the way, in a case of using a light source having different divergence angles in a plane perpendicular to the emission direction of light, it is preferable to determine the effective diameter $\Phi$ of the lens in such a way that rays in a direction in which the divergence angle is large have no loss, from the viewpoint of the efficiency of light utilization. Assuming that the divergence half-angle in the direction in which divergence angle is large is expressed by $\theta vi$, the light emission half-width wv1 of the light beam at the lens position is expressed by Equation (2) below.

$$wv1 = wv + f \times \mathrm{Tan}(\theta vi) \quad (2)$$

As a result, in the case of using the lens having the focal length f, it is preferable to set the effective diameter $\Phi$ of the lens to be equal to or greater than 2×wv1 in order to efficiently use the energy within the divergence half-angle $\theta vi$. As a result, in a case in which the focal length f is increased, a lens having an effective diameter $\Phi$ large in proportion to f is needed. In a case in which the effective diameter of the lens is smaller than the value of Eq. (2), a part of the energy within the divergence half-angle $\theta vi$ is lost by vignetting.

CITATION LIST

Patent Literature

Patent Literature 1: Japanese Unexamined Patent Application Publication No. Hei 2-235010

SUMMARY OF INVENTION

Technical Problem

From the relation between Eqs. (1) and (2), the focal length f, the effective diameter $\Phi$ of the lens, and the divergence half-angles $\theta ho$ and $\theta vo$ after collimation cannot be determined independently for the light source having the light emission half-widths wh and wv, and there is a trade-off relation among them. More specifically, in order to reduce the divergence angle, it is necessary to increase the focal length f and place a large-sized lens at a distant position. In a case of using a lens having a short focal length f, the divergence angle cannot be reduced. Thus, in the field there is a problem that it is difficult to simultaneously satisfy the needs for downsizing, small divergence angle, and high degree of efficiency of light utilization.

One or more embodiments according to the present disclosure are made in order to solve this problem, and a purpose of the embodiments is to provide a collimated light generating apparatus that can simultaneously satisfy the needs for downsizing, small divergence angle, and high degree of efficiency of light utilization.

Solution to Problem

According to the present disclosure, there is provided a collimated light generating apparatus including: a lens including both an incidence surface having a cylindrical concave shape, and an emitting surface having a convex shape axially symmetric with respect to an optical axis; and a light source such that divergence angle in a first direction in a plane perpendicular to the optical axis differs from divergence angle in a second direction different from the first direction by 90 degrees, wherein the light source is placed at a position of incidence-surface-side focal length for the second direction of the lens, and the first direction of the light source is aligned with curvature direction of the cylindrical shape of the lens.

Advantageous Effects of Invention

A collimated light generating apparatus according to the present disclosure includes a lens including both an incidence surface having a cylindrical concave shape, and an emitting surface having a convex shape with respect to an optical axis, wherein a light source having different divergence angles in a first direction and in a second direction is located at the position of incidence-surface-side focal length for the second direction of the lens, and wherein the first direction is aligned with curvature direction of the cylindrical shape of the lens. As a result, the collimated light

DESCRIPTION OF EMBODIMENTS

Hereafter, to explain this application in greater detail, embodiments according to the present disclosure will be described with reference to the accompanying drawings.

Embodiment 1

Figure 1A:
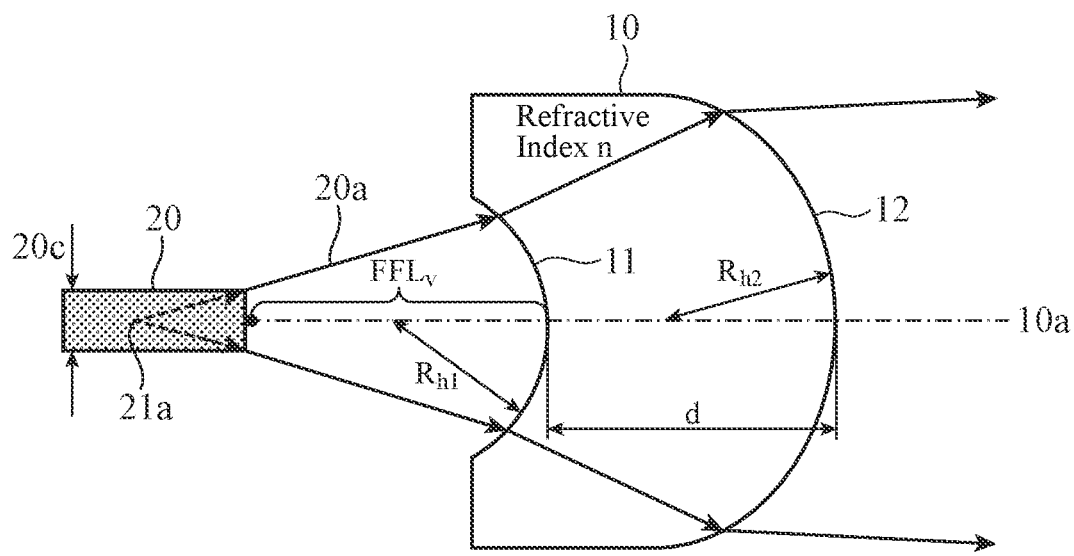
FIG. 1A is a plane view of a collimated light generating apparatus of Embodiment 1 of the present disclosure.
Figure 1B:
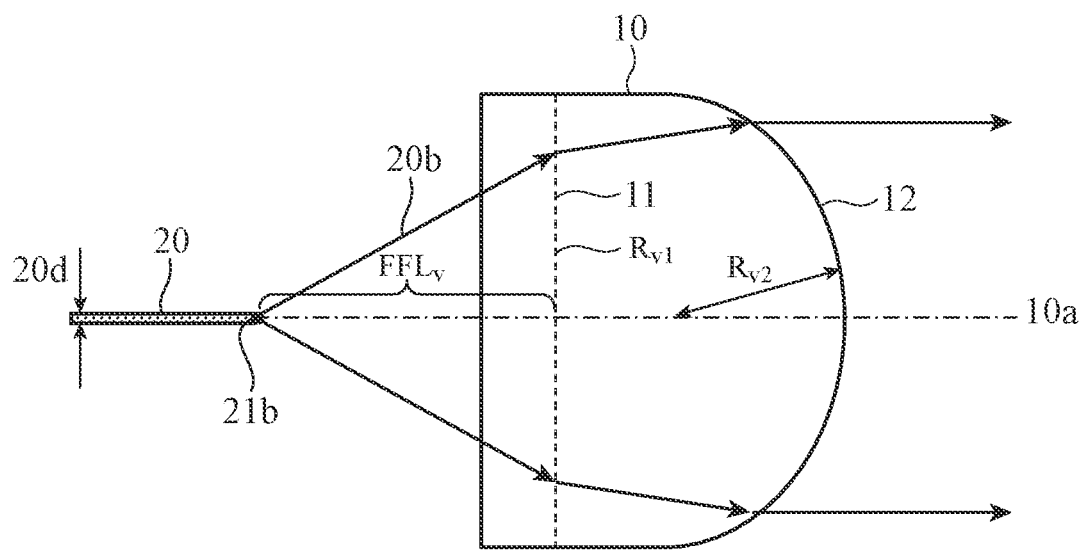
FIG. 1B is a side view.

FIG. 1 shows explanatory illustrations of a collimated light generating apparatus according to Embodiment 1, wherein FIG. 1A is a plane view, and FIG. 1B is a side view.

The collimated light generating apparatus according to Embodiment 1 includes a semiconductor laser as a light source 20 such that a divergence angle in a horizontal direction, which is one direction contained in a plane perpendicular to the optical axis, differs from another divergence angle in a vertical direction, contained in the plane, rotated from the one direction by 90 degrees. Rays (light beam) 20a in the horizontal direction determine a minimum divergence half-angle, and this minimum divergence half-angle is typically 2 to 15 degrees (half-angle 1/e2). An internal position 21a is a virtual emitting point of the horizontal rays 20a. Rays (light beam) 20b in the vertical direction determine a maximum divergence half-angle, and this maximum divergence half-angle is typically 15 to 45 degrees (half-angle 1/e2). An emitting point of the vertical rays 20b is at a facet 21b of the light source 20. Further, the light source 20 has finite light emitting widths 20c and 20d in the horizontal direction and in the vertical direction, respectively. The horizontal light emitting width 20c usually ranges from several μm to several hundreds of μm. The vertical light emitting width 20d usually ranges from one micrometer to several μm.

Figures 2A, 2B:
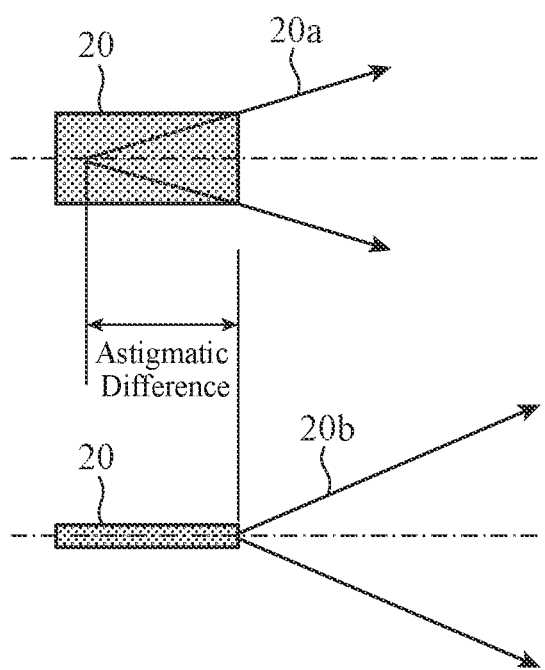
FIG. 2A is a plane view of a light source in the collimated light generating apparatus of Embodiment 1 of the present disclosure.
FIG. 2B is a side view.

As shown in FIGS. 2A and 2B, the semiconductor laser, which is the light source 20, generally has an astigmatic difference of the order of several μm to 20 μm. A virtual emitting point in the horizontal direction differs from that in the vertical direction, and rays in the horizontal direction appear to emanate from an inner point located inwardly from a facet of the semiconductor laser. That is, the internal position 21a is a virtual emitting point. The lens 10 is an optical element of center thickness d with an incidence surface 11 and an emitting surface 12, and is produced of glass of refractive index n. The lens 10 is produced using a typical method of producing a lens, such as grinding or molding. Although not illustrated on the incidence surface 11 or on the emitting surface 12, one or more antireflection coatings at the wavelength of the light source are made on each of the surfaces. The incidence surface 11 has a cylindrical concave shape with respect to the horizontal rays 20a of the light source 20, and the emitting surface 12 has a convex shape axially symmetric with respect to the optical axis 10a of the lens 10. The incidence surface 11 has curvature with radius of curvature $R_{h1}$ in the horizontal direction, and curvature with radius of curvature $R_{v1}$ (flat plane) in the vertical direction. The emitting surface 12 has curvature with radius of curvature $R_{v2}$ both in the horizontal direction and in the vertical direction. The radius of curvature $R_{h1}$ in the horizontal direction of the incidence surface 11, the radius of curvature $R_{h2}$ in the horizontal direction of the emitting surface 12, the thickness d of the lens, and the refractive index n of the glass are designed to satisfy the relation shown in Equation (3) below.

$$R_{h1} - R_{h2} + \frac{n-1}{n}d = 0 \tag{3}$$

The sign of the radius of curvature $R_{h1}$ or $R_{h2}$ is defined to be positive in a case in which a position of the center of curvature is located on the side of the light source with respect to the intersection of the incidence surface 11 or emitting surface 12 and the optical axis 10a, and negative in a case in which the position is located on the opposite side.

With respect to the vertical rays 20b, focal length f for the vertical direction and front (light-source-side) focal length FFLv are expressed by Equations (4), by using the radius of curvature $R_{v1}$ in the vertical direction of the incidence surface 11, the radius of curvature $R_{v2}$ in the vertical direction of the emitting surface 12, and the thickness d of the lens, and the refractive index n of the glass.

$$f = \frac{R_{v1} R_{v2}}{(n-1)\left(R_{v1} - R_{v2} + \frac{n-1}{n}d\right)} = \tag{4}$$

$$\frac{1}{(n-1)\left(\frac{1}{R_{v2}} - \frac{1}{R_{v1}} + \frac{d}{R_{v1}R_{v2}}\frac{n-1}{n}\right)}$$

$$FFL_v = f - h1 = f\left(1 - \frac{n-1}{n}\frac{d}{R_{v2}}\right)$$

Here, h1 denotes a position of front (light-source-side) principal point for the vertical direction of the lens 10, and its sign is defined to be positive in a case in which the principal point position is apart from the intersection of the incidence surface 11 and the optical axis 10a toward the inside of the lens. In a case in which the radius of curvature $R_{v1}$ is infinite (flat surface), Eqs. (4) are simplified into Equations (5) as follows.

$$f = \frac{R_{v2}}{n-1} \tag{5}$$

$$FFL_v = \frac{R_{v2}}{n-1} - \frac{d}{n}$$

In a case in which the emitting surface 12 is axially symmetric, the radius of curvature $R_{h2}$ is equal to $R_{v2}$, and therefore Eq. (3) is associated with Eqs. (5). The light source 20 is arranged in such a way that the facet 21b is positioned at the focal length FFLv for the vertical direction of the lens 10.

Figure 3A:
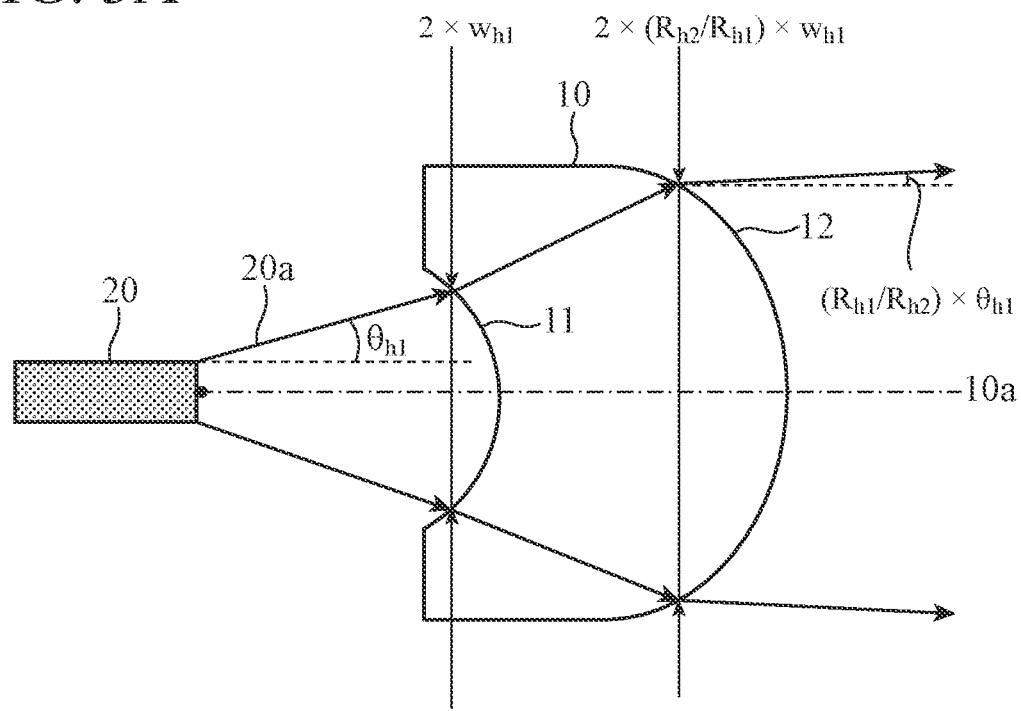
FIG. 3A is a plane view for explaining a light path of the collimated light generating apparatus of Embodiment 1 of the present disclosure.
Figure 3B:
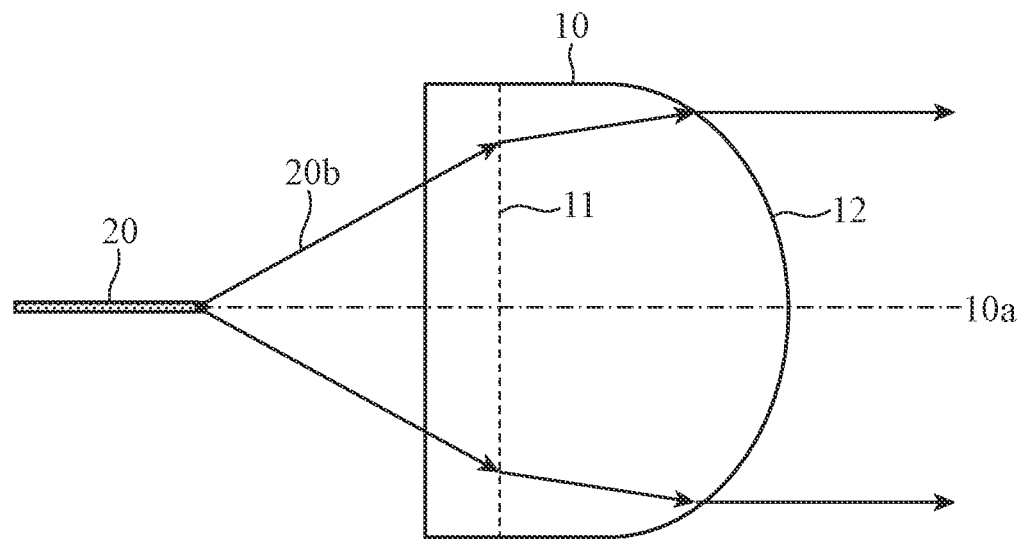
FIG. 3B is a side view.

Next, the operation in accordance with Embodiment 1 will be explained with reference to FIG. 3. FIG. 3A is a plane view, and FIG. 3B is a side view.

Rays emitted from the light source 20 expand to incident on the incidence surface 11 of the lens 10, propagate through the inside of the lens from the incidence surface 11 to the emitting surface 12, and emitted from the emitting surface 12. Because the incidence surface 11 has a cylindrical shape, the horizontal rays 20a and the vertical rays 20b experience different effects according to the shape of the incidence surface 11. For the sake of simplicity, only the horizontal rays (light beam) 20a in the horizontal direction and the vertical rays (light beam) 20b in the vertical direction are treated as rays (light beam) from the light source 20.

The horizontal light beam 20a appears to emanate from the internal position 21a of the semiconductor laser, and beam diameter of the horizontal light beam 20a is expanded by the concave surface with the radius of curvature $R_{h1}$ and the convex surface with the radius of curvature $R_{h2}$. These behaviors of the light beam will be explained using ray matrices (See, for example, a literature: Lasers, A. E. Siegman, University Science Books, Mill Valley Calif., 1986). The light beam 20a from the light source 20 propagates over the distance (focal length FFLv) from the light source 20 to the incidence surface 11 of the lens 10, and is incident on the lens 10. The operation of the lens 10 can be explained as alterations which the horizontal light beam 20a experiences from the optical elements, which are the dielectric boundary surface (incidence surface 11) with the radius of curvature $R_{h1}$ and the refractive index n, the propagation in the dielectric with the thickness d and the refractive index n, and the dielectric boundary surface (emitting surface 12) with the radius of curvature $R_{h2}$ and the refractive index n. The horizontal light beam 20a, which is expressed by a column vector, and the optical elements' alterations of the horizontal ray 20a can be respectively described by Equation (6), Equation (7), Equation (8), and Equation (9) by using matrices each having 2 rows and 2 columns.

$$\begin{pmatrix} r' \\ \theta' \end{pmatrix} = \begin{pmatrix} 1 & FFLv \\ 0 & 1 \end{pmatrix} \begin{pmatrix} r \\ \theta \end{pmatrix} \quad (6)$$

$$= \begin{pmatrix} 1 & \frac{R_{v2}}{n-1} - \frac{d}{n} \\ 0 & 1 \end{pmatrix} \begin{pmatrix} r \\ \theta \end{pmatrix}$$

$$\begin{pmatrix} r' \\ \theta' \end{pmatrix} = \begin{pmatrix} 1 & 0 \\ \frac{n-1}{nR_{h1}} & \frac{1}{n} \end{pmatrix} \begin{pmatrix} r \\ \theta \end{pmatrix} \quad (7)$$

$$\begin{pmatrix} r' \\ \theta' \end{pmatrix} = \begin{pmatrix} 1 & d \\ 0 & 1 \end{pmatrix} \begin{pmatrix} r \\ \theta \end{pmatrix} \quad (8)$$

$$\begin{pmatrix} r' \\ \theta' \end{pmatrix} = \begin{pmatrix} 1 & 0 \\ -\frac{n-1}{R_{h2}} & n \end{pmatrix} \begin{pmatrix} r \\ \theta \end{pmatrix} \quad (9)$$

Here, r denotes the height from the optical axis of a ray incident on each optical element, θ denotes the angle of the ray incident on each optical element with respect to the optical axis, r' denotes the height from the optical axis of the ray emerging from each optical element, and θ' denotes the angle of the ray emerging from each optical element. In the following explanation in this description, the components (1, 1), (1, 2), (2, 1), and (2, 2) of the matrix having 2 rows and 2 columns showing the alteration by each optical element are defined as A, B, C, and D, respectively. For example, C in Eq. (7) refers to $(n-1)/(nR_{h1})$.

As a result, the alteration that the horizontal light beam 20a receives between the incidence surface 11 and the emitting surface 12 is expressed as a product of the matrices reflecting respective optical elements, by Equation (10) as follows.

$$\begin{pmatrix} r' \\ \theta' \end{pmatrix} = \begin{pmatrix} 1 & 0 \\ -\frac{n-1}{R_{h2}} & n \end{pmatrix} \begin{pmatrix} 1 & d \\ 0 & 1 \end{pmatrix} \begin{pmatrix} 1 & 0 \\ \frac{n-1}{nR_{h1}} & \frac{1}{n} \end{pmatrix} \begin{pmatrix} r \\ \theta \end{pmatrix} \quad (10)$$

$$= \begin{pmatrix} 1 + \frac{n-1}{n}\frac{d}{R_{h1}} & \frac{d}{n} \\ (n-1)\left(\frac{1}{R_{h1}} - \frac{1}{R_{h2}} - \frac{n-1}{n}\frac{d}{R_{h1}R_{h2}}\right) & 1 - \frac{n-1}{n}\frac{d}{R_{h2}} \end{pmatrix} \begin{pmatrix} r \\ \theta \end{pmatrix}$$

Rewriting Eq. (10) by using the relation shown in Eq. (3) yields Equation (11) below.

$$\begin{pmatrix} r' \\ \theta' \end{pmatrix} = \begin{pmatrix} \frac{R_{h2}}{R_{h1}} & \frac{d}{n} \\ 0 & \frac{R_{h1}}{R_{h2}} \end{pmatrix} \begin{pmatrix} r \\ \theta \end{pmatrix} = \begin{pmatrix} \frac{R_{h2}}{R_{h1}}r + \frac{d}{n}\theta \\ \frac{R_{h1}}{R_{h2}}\theta \end{pmatrix} \quad (11)$$

In a case of an ideal expanding system satisfying Eq. (3), a beam radius wh1 in the horizontal direction on the incidence surface 11 is magnified approximately $R_{h2}/R_{h1}$ times on the emitting surface 12, and the divergence half-angle θh1 of the horizontal light beam 20a incident on the incidence surface 11 is magnified approximately $R_{h1}/R_{h2}$ times on the emitting surface.

As a result, depending on the ratio of the radii of curvature $R_{h1}$ and $R_{h2}$, the divergence angle in the horizontal direction can be reduced. This shows that, for the horizontal direction, by using the expanding system instead of collimation, the divergence angle in the horizontal direction can be determined independently of the relation shown in Eqs. (1) between the light emission half-widths wh or wv of the light source and the focal length f.

Further, the alteration which the horizontal light beam 20a receives while traveling from the light source 20 to the emitting surface 12 can be determined as the product of the matrix of Eq. (6) and the matrix in Eq. (11), and is expressed by Equation (12).

$$\begin{pmatrix} r' \\ \theta' \end{pmatrix} = \begin{pmatrix} \frac{R_{h2}}{R_{h1}} & \frac{d}{n} \\ 0 & \frac{R_{h1}}{R_{h2}} \end{pmatrix} \begin{pmatrix} 1 & FFLv \\ 0 & 1 \end{pmatrix} \begin{pmatrix} r \\ \theta \end{pmatrix} \quad (12)$$

-continued $$= \begin{pmatrix} \dfrac{R_{h2}}{R_{h1}} & \dfrac{R_{h2}}{R_{h1}}FFLv + \dfrac{d}{n} \\ 0 & \dfrac{R_{h1}}{R_{h2}} \end{pmatrix}$$

$$= \begin{pmatrix} \dfrac{R_{h2}}{R_{h1}}(r + FFLv\theta) + \dfrac{d}{n}\theta \\ \dfrac{R_{h1}}{R_{h2}}\theta \end{pmatrix}$$

Comparing Eq. (12) to Eq. (11), it is found that the beam diameter on the incidence surface 11 simply increases from r to r+FFLv×θ due to the propagation from the light source 20 to the incidence surface 11, and that the rate of change for the beam diameter between the incidence surface 11 and the emitting surface 12 and the rate of change for the divergence angle between them are unchanged. It is clear from Eq. (12) that this is not limited to the case in which the propagation distance is FFLv. It is clear from the above description that in the collimated light generating apparatus according to the present disclosure, the divergence angle in the horizontal direction is independent of the distance in a direction of the optical axis between the light source 20 and the lens 10. Further, an advantage that not only the influence of the inclination of rays upon a positional deviation in the direction of the optical axis, but also the influence upon a positional deviation in the horizontal direction is small will be explained by using a ray matrix taking the positional deviations into consideration. Taking the positional deviations into consideration, the alteration which a horizontal ray 20a receives while traveling between the incidence surface 11 of the lens 10 and the emitting surface 12 are expressed by Equation (13) from Eq. (11). Here, Δ denotes the amount of positional deviation of the lens, and Δ' denotes the inclination of the lens.

$$\begin{pmatrix} E \\ F \end{pmatrix} = \begin{pmatrix} 1-A & d-B \\ -C & 1-D \end{pmatrix}\begin{pmatrix} \Delta \\ \Delta' \end{pmatrix} \quad (13)$$

$$\begin{pmatrix} r' \\ \theta' \\ 1 \end{pmatrix} = \begin{pmatrix} \dfrac{R_2}{R_1} & \dfrac{d}{n} & E \\ 0 & \dfrac{R_1}{R_2} & F \\ 0 & 0 & 1 \end{pmatrix}\begin{pmatrix} r \\ \theta \\ 1 \end{pmatrix}$$

$$= \begin{pmatrix} \dfrac{R_{h2}}{R_{h1}} & \dfrac{d}{n} & \left(1-\dfrac{R_{h2}}{R_{h1}}\right)\Delta + \left(d-\dfrac{d}{n}\right)\Delta' \\ 0 & \dfrac{R_{h1}}{R_{h2}} & \left(1-\dfrac{R_{h1}}{R_{h2}}\right)\Delta' \\ 0 & 0 & 1 \end{pmatrix}\begin{pmatrix} r \\ \theta \\ 1 \end{pmatrix}$$

Simplifying this yields Equations (14), and it is found that there is a property that the positional deviation Δ in the horizontal direction has no effect on the angle of the rays.

$$r' = \dfrac{R_{h2}}{R_{h1}}r + \dfrac{d}{n}\theta + \left(1-\dfrac{R_{h2}}{R_{h1}}\right)\Delta + \left(d-\dfrac{d}{n}\right)\Delta' \quad (14)$$

$$\theta' = \dfrac{R_{h1}}{R_{h2}}\theta + \left(1-\dfrac{R_{h1}}{R_{h2}}\right)\Delta'$$

On the other hand, because the facet 21b of the semiconductor laser is located at the position of the focal length FFLv, the vertical rays 20b are collimated by both the flat surface of the incidence surface 11 and the convex surface with the radius of curvature $R_{v2}$.

The behaviors of the rays will be explained by using ray matrices, as in the case of the horizontal direction. A ray 20b emitted from the light source propagate the distance (focal length FFLv) from the light source to the incidence surface 11 of the lens 10, and is incident on the lens 10. The alterations of the lens 10 can be explained as ones which the vertical ray 20b receive from the optical elements, which are the dielectric boundary surface (incidence surface 11) with the radius of curvature $R_{v1}$ and the refractive index n, the propagation in the dielectric with the thickness d and the refractive index n, and the dielectric boundary surface (emitting surface 12) with the radius of curvature $R_{v2}$ and the refractive index n. For the vertical ray 20b which is expressed by a column vector, the optical elements' alterations of the vertical ray 20b can be respectively described by Equation (15), Equation (16), and Equation (17) by using matrices each having 2 rows and 2 columns.

$$\begin{pmatrix} r' \\ \theta' \end{pmatrix} = \begin{pmatrix} 1 & 0 \\ \dfrac{n-1}{nR_{v1}} & \dfrac{1}{n} \end{pmatrix}\begin{pmatrix} r \\ \theta \end{pmatrix} \quad (15)$$

$$\begin{pmatrix} r' \\ \theta' \end{pmatrix} = \begin{pmatrix} 1 & d \\ 0 & 1 \end{pmatrix}\begin{pmatrix} r \\ \theta \end{pmatrix} \quad (16)$$

$$\begin{pmatrix} r' \\ \theta' \end{pmatrix} = \begin{pmatrix} 1 & 0 \\ -\dfrac{n-1}{R_{v2}} & n \end{pmatrix}\begin{pmatrix} r \\ \theta \end{pmatrix} \quad (17)$$

From these equations, the alteration that the vertical ray 20b receives while propagating between the incidence surface 11 and the emitting surface 12 is expressed as the product of these matrices, as shown in Equation (18) below.

$$\begin{pmatrix} r' \\ \theta' \end{pmatrix} = \begin{pmatrix} 1 & 0 \\ -\dfrac{n-1}{R_{v2}} & n \end{pmatrix}\begin{pmatrix} 1 & d \\ 0 & 1 \end{pmatrix}\begin{pmatrix} 1 & 0 \\ \dfrac{n-1}{nR_{v1}} & \dfrac{1}{n} \end{pmatrix}\begin{pmatrix} r \\ \theta \end{pmatrix} \quad (18)$$

$$= \begin{pmatrix} 1 + \dfrac{n-1}{n}\dfrac{d}{R_{v1}} & \dfrac{d}{n} \\ \left(\dfrac{1}{R_{v1}} - \dfrac{1}{R_{v2}} - \dfrac{n-1}{n}\dfrac{d}{R_{v1}R_{v2}}\right)(n-1) & 1 - \dfrac{n-1}{n}\dfrac{d}{R_{v2}} \end{pmatrix}\begin{pmatrix} r \\ \theta \end{pmatrix}$$

Rewriting this by assuming the radius of curvature $R_{v1}$ to be infinite (flat surface) and setting the radius of curvature $R_{v2}=R_{h1}$ yields Equation (19) below.

$$\begin{pmatrix} r' \\ \theta' \end{pmatrix} = \begin{pmatrix} 1 & \dfrac{d}{n} \\ -\dfrac{n-1}{R_{v2}} & 1 - \dfrac{n-1}{n}\dfrac{d}{R_{v2}} \end{pmatrix}\begin{pmatrix} r \\ \theta \end{pmatrix} \quad (19)$$

The front (light-source-side) principal point position h1 and the light-source-side (front side) focal length FFLv are (D−1)/C and −D/C in Eq. (19), respectively. Calculation of these on the basis of Eq. (19) shows that the result of the calculation is the same as in Eq. (5).

Further, the alteration that the vertical ray 20b receives while traveling from the light source 20 to the emitting surface 12 can be determined as the product of the matrix of the Eq. (6) and the matrix in Eq. (19), and is expressed by Equation (20).

$$\begin{pmatrix} r' \\ \theta' \end{pmatrix} = \begin{pmatrix} 1 & \dfrac{d}{n} \\ -\dfrac{n-1}{R_{v2}} & 1 - \dfrac{n-1}{n}\dfrac{d}{R_{v2}} \end{pmatrix} \begin{pmatrix} 1 & FFLv \\ 0 & 1 \end{pmatrix} \begin{pmatrix} r \\ \theta \end{pmatrix}$$

$$= \begin{pmatrix} 1 & FFLv + \dfrac{d}{n} \\ -\dfrac{n-1}{R_{v2}} & 0 \end{pmatrix} \begin{pmatrix} r \\ \theta \end{pmatrix}$$

$$= \begin{pmatrix} r + \left(FFLv + \dfrac{d}{n}\right)\theta \\ -\dfrac{n-1}{R_{v2}} r \end{pmatrix} \quad (20)$$

It is found from Eq. (20) that the vertical ray 20b from a certain point of the light source 20 is altered into collimated light after emerging from the emitting surface 12. Further, in a case in which an incident ray has a finite light emitting width, the relation shown in the Eq. (1) is acquired by replacing the height r from the optical axis of the incident ray in Eq. (20) with the light emission half-width wv1.

Because the relation between the horizontal ray and the vertical ray is acquired in this way, the focal length f for the vertical direction, i.e., the radius of curvature $R_{v2}$ and the refractive index n of the lens can be determined in accordance with a required value of the divergence angle in the vertical direction, and the radius of curvature $R_{h1}$ and the thickness d can be selected in accordance with the required value of the divergence angle in the horizontal direction.

In order to show the significance of the present disclosure, an example of collimating a semiconductor laser with a wavelength of 808 nm manufactured by EAGLEYARD Co. (model number: EYP-BAL-0808-08000-4020-CMT-0000) by using an axially-symmetric plano-convex lens is considered. It is assumed that the above-mentioned semiconductor laser has a divergence half-angle of 8.5° in the horizontal direction, a divergence half-angle of 25.5° in the vertical direction, a light emitting width of 200 μm in the horizontal direction, and a light emitting width of 1 μm in the vertical direction. The aim of collimation is assumed to keep the divergence angle after collimation both in the horizontal direction and in the vertical direction at 1°.

Figure 4:
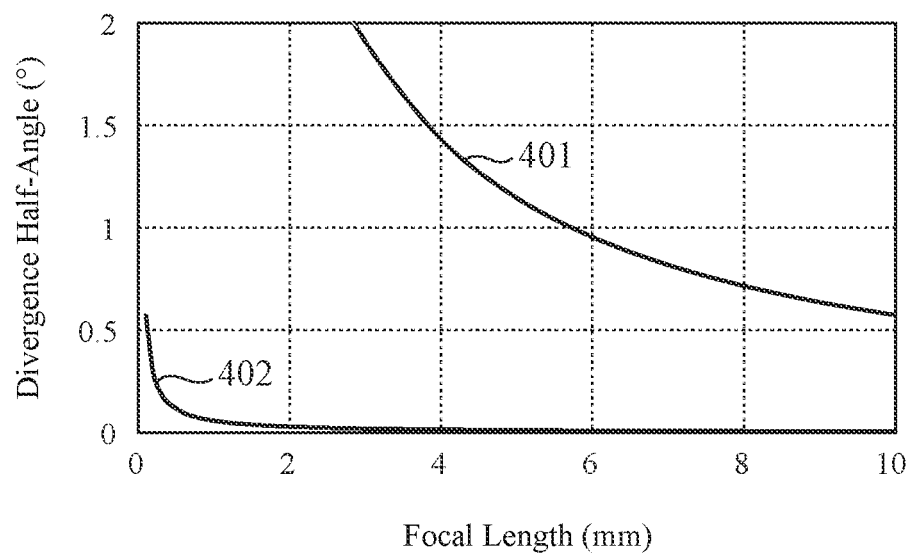
FIG. 4 is an explanatory drawing showing a relation between divergence half-angles θho and θvo after collimation in horizontal direction and in vertical direction, and focal length f.
Figure 5:
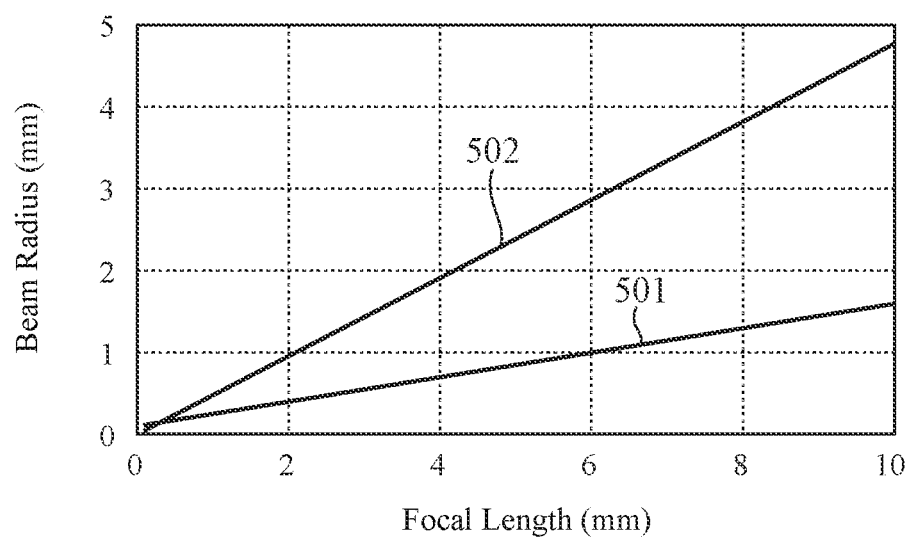
FIG. 5 is an explanatory drawing showing a relation between light emission half-widths wh and wv in directions of the light source, and the focal length f.

FIG. 4 shows the relation between divergence half-angles θho 401 and θvo 402 in the horizontal direction and in the vertical direction after collimation, and the focal length f. FIG. 5 shows the relation between light emission half-widths wh 501 and wv 502 in the respective directions of the light source 20, and the focal length f. According to Eqs. (1) and (2), a lens with a focal length of 5.7 mm and an effective aperture of 5.5 mm is required as shown in FIGS. 4 and 5. By contrast, according to the present embodiment, for example, a lens with a radius of curvature $R_{h1}$ of 0.2 mm, a radius of curvature $R_{h2} = R_{v2}$ of 1.7 mm, a thickness of 3.4 mm, an refractive index of 1.8, a focal length for the vertical direction of 2.1 mm, a light-source-side focal position of 0.25 mm, and an effective diameter of 2 mm can be used, and great reduction in the diameter of the lens can also be achieved while small divergence angle and high degree of efficiency of light utilization are satisfied. Obviously, the values including the radii of curvature are not limited to this configuration, and further downsizing can be achieved by shortening the focal length for the vertical direction and performing scaling.

As explained above, with respect to the light source 20 having a large divergence angle in the vertical direction and a small divergence angle in the horizontal direction, the lens 10 including the incidence surface 11 having a cylindrical concave shape, and the emitting surface 12 having a shape axially symmetric with respect to the optical axis 10a and forming a convex shape is placed in such a way that the horizontal direction of the light source 20 is aligned with a curvature direction of the cylindrical shape of the lens 10, and that the facet 21b of the light source 20 is located at the position of the incidence-surface-side focal length FFLv for the vertical direction. Hence, the horizontal light of the light source 20 is expanded between the incidence surface 11 and the emitting surface 12 of the lens 10, and the vertical light of the light source 20 is converted into approximately collimated light on the emitting surface 12 of the lens 10. Thus, a collimated light generating apparatus that simultaneously satisfies the needs for small divergence angle, high degree of efficiency of light utilization, and downsizing can be provided.

Although in the above-mentioned example the case in which the light source 20 is a semiconductor laser is explained, the same advantages are provided also for a light source which is another type of laser or is not a laser. However, the case in which a semiconductor laser is used is more preferable, and reasons will be explained below.

One reason is that increase in the divergence angle due to the astigmatic difference does not occur. In a case of using a axially symmetric lens, when the focal position of the lens is arranged at the facet 21b of the semiconductor laser, a deviation in focus occurs in the horizontal direction to increase the divergence angle. Further, there is also a method for correcting the astigmatic difference, wherein a lens having different focal lengths for the vertical direction and for the horizontal direction is used to align the focal position in the horizontal direction to the internal position 21a of the semiconductor laser, and align the focal position in the vertical direction to the facet 21b of the semiconductor laser. However, because there is variation in the internal position 21a which is the emitting point position in the horizontal direction of the semiconductor laser, and the internal position varies dependently on the laser output, it is difficult to suppress the increase in the divergence angle due to the astigmatic difference under plural operating conditions. According to the present embodiment, because the divergence angle in the horizontal direction is independent of the arrangement distance between the light source 20 and the lens 10, placing the facet 21b of the light source 20 at the position of the focal length FFLv for the vertical direction provides an effect of preventing the increase in the divergence angle in the horizontal direction even when an astigmatic difference exists and, further, there is variation and laser power dependence.

As another advantage, the positioning accuracy in the horizontal direction between the light source 20 and the lens 10 can be relaxed. A problem with the conventional collimating method is that when positional deviations occur in the horizontal direction or in the vertical direction, the emission direction of the light beam is inclined with respect to the ideal emission direction, as can be seen from Eq. (20). Positioning the lens 10 with a high degree of accuracy with respect to the light source 20 is needed in order to suppress the inclination of the light beam, and, typically, positioning accuracy of the order of several μm to several tens of μm is needed.

By the way, while the accuracy of position of the light emitting point with respect to the outside shape of the chip of the semiconductor laser is high in the vertical direction, the accuracy is low in the horizontal direction. This is because while, as to the vertical direction, the control of the thickness is performed strictly, as to the horizontal direction, there is dependence on the accuracy at a time of cutting out the chip from a wafer, and the cutout accuracy of several μm to several tens of μm is normally provided as to the horizontal direction. Hence, even in a case in which there is variation in the light emitting point position in the horizontal direction with respect to the outside shape of the chip, and, for example, the chip and the lens are assembled with a high degree of accuracy by using their outside shapes as reference, variation occurs in the relative positions of the light emitting point and the lens in the horizontal direction. In contrast, in this embodiment, there is provided an advantage of, even though there occurs a positional deviation in the horizontal direction due to variation in the position where the chip is cut out, being able to reduce the influence on the inclination of the emission direction of the light beam, and facilitate the assembly using the outside shapes as reference.

Although the shape of the incidence surface 11 of the lens 10 is a cylindrical one which is on a concave surface with respect to the horizontal direction, this concave shape can be a spherical one or an aspherical one. It can be expected that, by forming the concave shape into an aspherical one, the aberration occurring in the optical system is corrected more greatly. By the way, the operation in the horizontal direction of the present disclosure is equivalent to collimating an image of the light source at the focal position of the dielectric boundary surface of the incidence surface 11 onto the dielectric boundary surface of the emitting surface 12. This collimation differs from collimations including, as well as axial-asymmetrically collimating, collimating, by using a conventional collimate lens, an image of a light source at a position of image formation by the dielectric boundary surface of an incidence surface onto the dielectric boundary surface of an emitting surface. As a result, it is clear that even though there is no strict match to Eq. (3), the advantage is provided, and this advantage is effective in a case in which the focal position of the dielectric boundary surface of the emitting surface 12 is not the position of image formation of the light source 20 by the dielectric boundary surface of the incidence surface 11, but is in a range close to the focal plane. Further, although the shape in the vertical direction is formed into a simple flat surface, the shape does not have to be formed into a perfectly flat surface, and the fact remains that the advantage of the present disclosure is provided even in a case in which the shape is formed into a concave surface or a convex surface. For example, because it is possible to dull the angle of incidence of the light beam by forming the shape into a concave surface, it can be expected that the aberration is further reduced. Although the shape of the emitting surface 12 is formed into a axially symmetric convex surface, the shape does not have to be strictly axially symmetric. Although it can be expected that, by forming the shape into a toroidal surface having different radii of curvature in the vertical direction and in the horizontal direction, the aberration is corrected greatly because the degree of flexibility of the design increases, the production of the lens, such as grinding or molding, is facilitated in a case in which the shape is a axially symmetric one. The material, of the lens 10 does not have to be glass, and can be plastic, crystal, or the like. It is not necessary to align the focal length FFLv of the lens 10 strictly to the installation position of the light source 20, and it is clear that no problem arises even though the installation position of the light source deviates forward or backward, as long as the divergence angle in the vertical direction falls within a desired value range. For example, in a case in which the divergence angle in the horizontal direction is the same as that in the vertical direction, it is seen from the relation between. Eq. (12) and Eq. (20) (calculation is performed by setting FFLv to FFLv+Δ) that an allowance can be provided as long as the divergence angle satisfies the following equation.

$$R_{h1}/R_{h2} \times \theta h1 = \Delta/f \times \theta v \qquad (21)$$

In this equation, θv denotes the divergence angle of light emitted in the vertical direction from the light source 20.

As previously explained, the collimated light generating apparatus of Embodiment 1 includes the lens including both the incidence surface having a cylindrical concave shape, and the emitting surface having a convex shape with respect to the optical axis, and the light source such that divergence angle in a first direction in a plane perpendicular to the optical axis differs from divergence angle in a second direction different from the first direction by 90 degrees, wherein the light source is placed at the position of the incidence-surface-side focal length for the other direction of the lens, and the direction of the light source is aligned with curvature direction of the cylindrical shape of the lens. Thus, the collimated light generating apparatus can satisfy the needs for downsizing, small divergence angle, and high degree of efficiency of light utilization.

Further, because in the collimated light generating apparatus of Embodiment 1, the light emitting point width in the direction of the light source is greater than that in the other direction, the light source having different divergence angles can be implemented.

Further, because in the collimated light generating apparatus of Embodiment 1, the light source has an astigmatic difference, a contribution to the implementation of the light source having different divergence angles can be made.

Further, because in the collimated light generating apparatus of Embodiment 1, the light source is a semiconductor laser, a collimated light generating apparatus that can satisfy the needs for downsizing, small divergence angle, and high degree of efficiency of light utilization can be obtained.

Embodiment 2

Figure 6A:
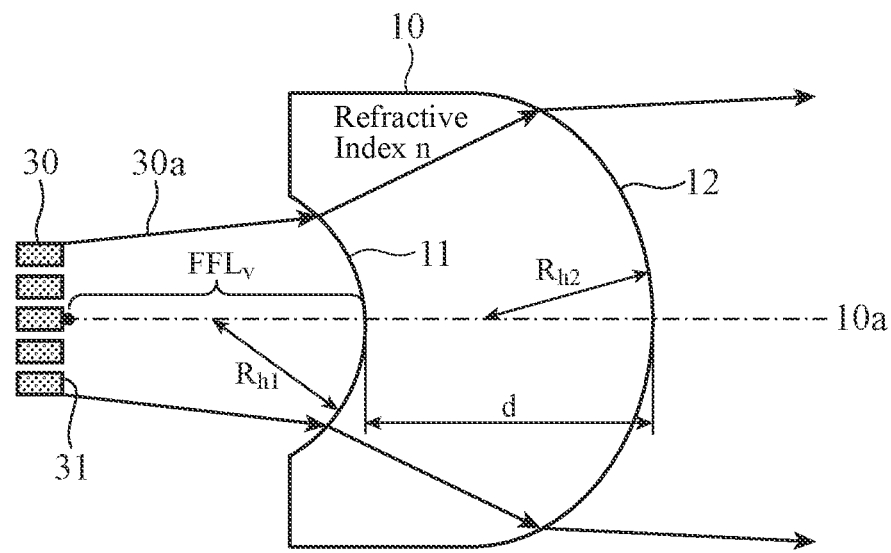
FIG. 6A is a plane view of a collimated light generating apparatus of Embodiment 2 of the present disclosure.
Figure 6B:
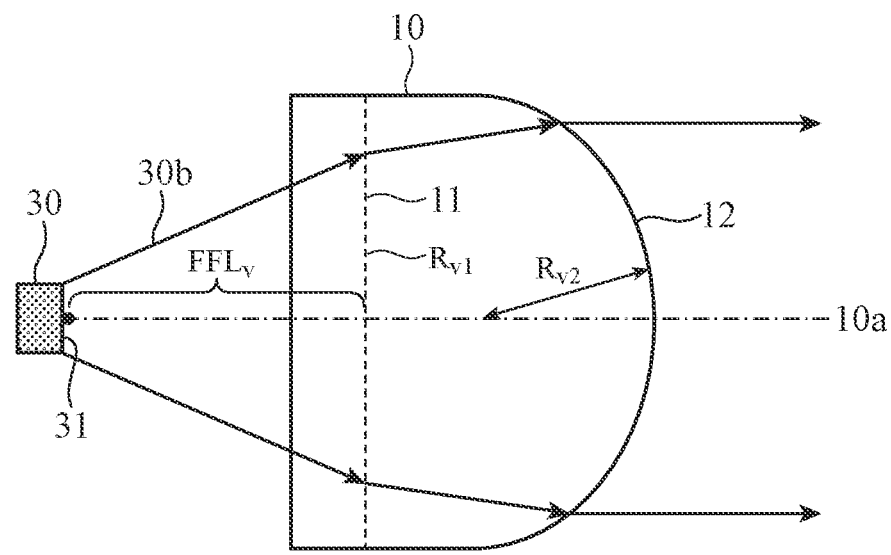
FIG. 6B is a side view.

FIG. 6 shows explanatory illustrations of a collimated light generating apparatus according to Embodiment 2, wherein FIG. 6A shows a plane view of the collimated light generating apparatus, and FIG. 6B shows a side view of the collimated light generating apparatus.

The collimated light generating apparatus according to Embodiment 2 differs from the light source 20 according to Embodiment 1 in that a semiconductor laser array having plural light emitting points in a horizontal direction is used as a light source 30. Because other parts are the same as those of Embodiment 1, the corresponding parts are denoted by the same reference signs and the explanation of the parts will be omitted hereafter.

Next, the operation according to Embodiment 2 will be explained.

As with Embodiment 1, a facet 31 of the light source 30 including the semiconductor laser array is placed at a position of a light-source-side focal length FFLv for vertical direction of a lens 10. The beam diameter of each of light beams emitted from the light emitting points, out of a horizontal light beam 30a from the light source 30, is expanded by a concave surface with a radius of curvature $R_{h1}$ and a convex surface with a radius of curvature $R_{h2}$ of the lens 10. Because the light source 30 is located at the position of the focal length FFLv, a vertical light beam 30b from the light source 30 is collimated by a flat surface of an incidence surface 11 and the convex surface with the radius of curvature $R_2$ of the lens 10. As a result, because the horizontal light of the light source 30 is expanded by the incidence surface 11 and an emitting surface 12 of the lens 10 and the vertical light of the light source 30 is converted into approximately collimated light by the emitting surface 12 of the lens 10, like in the case of Embodiment 1, the collimated light generating apparatus that simultaneously satisfies the needs for small divergence angle, high degree of efficiency of light utilization, and downsizing can be implemented.

In a case in which the light emitted from the light source 30 including the semiconductor laser array is simply collimated, the beam pattern after the lens looks array-like, and its spatial uniformity is low. In contrast, because in this embodiment, the lens 10 including the incidence surface 11 having a cylindrical concave shape, and the emitting surface 12 having a shape axially symmetric with respect to an optical axis 10a and forming a convex shape is located in such a way that the horizontal direction of the light source 30 is aligned with a curvature direction of the cylindrical shape of the lens, and that the facet 31 of the light source 30 is located at the position of the focal length FFLv for the vertical direction. As a result, the beam emitted from each of the light emitting points in the horizontal direction can be expanded, which allows the beams to overlap with the divergence angle reduced. Therefore, a feature that a spatially-uniform beam can be produced is provided. A spatially-uniform beam is useful particularly when it is used for direct lighting without using a uniform optical system or the like. In addition, because the beams of the plural light emitting points overlap, there is provided an advantage of being able to also reduce speckles which are a problem in a case in which a laser is used for lighting, without addition of a uniform optical system.

Further, the astigmatic difference is affected by the distribution of temperatures within the semiconductor laser. Because in the semiconductor laser array, the heat generation density in a central portion thereof differs from that in an end portion thereof, the internal temperature distribution varies both in the central portion and in the end portion, and this results in a cause of variation in the size of the astigmatic difference for each of the light emitting points. However, in this embodiment, there is provided an advantage of being able to suppress the increase in the divergence angle and providing stable collimated light even if there is variation in the astigmatic difference for each of the light emitting points.

It is needless to say that even in a case in which the light source 30 is an array-type light source in which each light emitting width or the pitch between the light emitting points differs dependently on its horizontal position, using the light source 30 in combination with the lens 10 according to the present disclosure provides the same advantage.

Comparing this case with a case of using an array-type optical element, the configuration is simple and is low in cost. Further, also in a case in which each light emitting width and the pitch between the light emitting points vary statically and dynamically in the horizontal direction, the configuration of Embodiment 2 provides an advantage of satisfying the needs for small divergence angle, high degree of efficiency of light utilization, and downsizing.

As previously explained, because in the collimated light generating apparatus according to Embodiment 2, the light source is configured so as to have plural light emitting points in one direction, the collimated light generating apparatus can satisfy the needs for downsizing, small divergence angle, and high degree of efficiency of light utilization.

Further, because in the collimated light generating apparatus according to Embodiment 2, the light source is configured so as to be a semiconductor laser array, a spatially-uniform beam can be acquired.

Embodiment 3

In Embodiment 3, a fill factor F.F. which is determined from each of the light emitting widths W of the plural light emitting points of the light source 30 and the pitch P between the light emitting points in Embodiment 2 is defined.

Figure 7A:
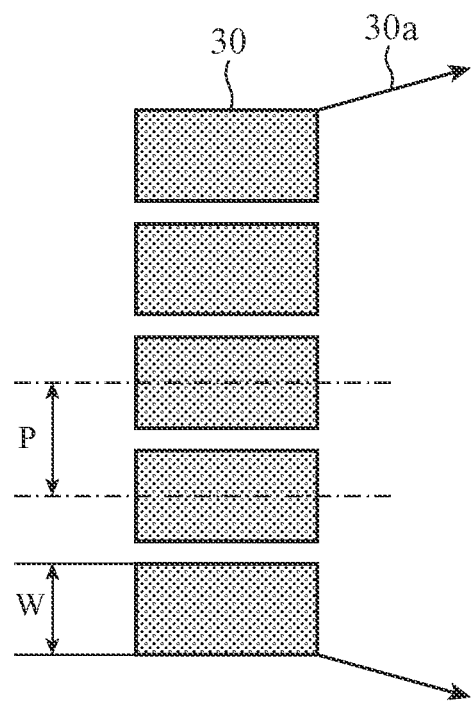
FIG. 7A is a plane view of a light source in a collimated light generating apparatus of Embodiment 3 of the present disclosure.
Figure 7B:
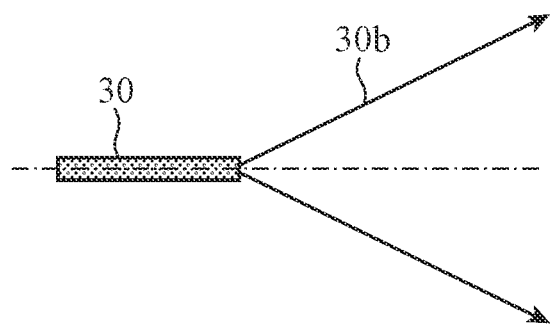
FIG. 7B is a side view.

FIG. 7 is an explanatory drawing showing a definition of a light source 30 of Embodiment 3. The light source 30 comprised of a semiconductor laser array is characterized by its light emitting width W and the pitch P between light emitting points, and a fill factor F.F. is defined by Equation (22) below.

$$F.F.=W/P \tag{22}$$

In this embodiment, a collimated light generating apparatus is preferable particularly in a case in which a semiconductor laser array in which the fill factor F.F. shown in Eq. (22) falls within a range of $0.5 \leq F.F. < 1$ is used as the light source 30. Because the whole configuration and the operation in the collimated light generating apparatus of Embodiment 3 are the same as those of Embodiment 2, an explanation of the configuration and the operation will be omitted hereafter.

A case in which the divergence angle of the light source 30 is reduced using an arrays type collimator lens comprised of lenses each rotationally symmetric, to the optical axis of one of light emitting points is considered. By using the light emitting width W and the focal length f of the lens, the divergence angle after the lens is ideally expressed by the following equation.

$$\theta ho = 2 \times TAN^{-1}(W/2/f) \tag{23}$$

Determining the focal length f such that light beams from the light emitting points do not overlap at the lens position yields the following equation.

$$f=(P-W)/(2 \times Tan(\theta hi/2)) \tag{24}$$

Rearranging Equations (23) and (24) yields the following equation:

$$Tan(\theta ho/2)/Tan(\theta hi/2)=F.F./(1-F.F.) \tag{25}$$

This shows that the divergence angle in the horizontal direction from the light source 30 and the divergence angle after the array-type lens are limited by the fill factor F.F. of the light source 30. For an array-type light source whose fill factor F.F. is equal to or greater than 0.5, according to Equation (25), it is understood that if such light source is located at a front side focal point position to perform collimation by using a conventional rotationally axially symmetric lens, the divergence angle in the horizontal direction cannot be reduced under a condition that no vignetting occurs in a beam within a certain divergence angle θ.

Although using a collimator lens including an array of lenses such that each lens is not axially symmetric with respect to a corresponding optical axis of light emitting points is conceivable, such lens is difficult to produce, and thus it is difficult to produce the lens at a low cost. Further, the difficulty of assembling the light source and the lens is also high.

In contrast, in the combination of the lens 10 and the light source 30 including a semiconductor laser array as disclosed in the present disclosure, it is possible to reduce the divergence angle in the horizontal direction even in a case in which the array-type light source has any fill factor F.F., and the collimated light generating apparatus that can satisfy the needs for small divergence angle, high degree of efficiency of light utilization, and downsizing can be implemented.

Now, we consider a case in which an optical element including a plurality of lenses 10 arranged in an array in accordance with the light emitting width W and with the pitch P between the light emitting widths of the light source 30 is used. In this case, the divergence angle in the horizontal direction is determined by the magnification which is the ratio of the beam diameter on the incidence surface and that on the emitting surface, as explained previously. Here, because the beam diameter on the incidence surface is not less than the light emitting width W, and the beam diameter on the emitting surface cannot be made to be greater than the pitch P between the light emitting points in order to prevent vignetting from occurring both in the inside of the lens and on the emitting surface, the maximum magnification is limited by the following equation.

$$m = P/W = 1/F.F. \quad (26)$$

As a result, the divergence angle in the horizontal direction after the lens is limited to the result of multiplying the original divergence angle by the fill factor F.F.

It is seen from the above result that the collimated light generating apparatus according to Embodiment 3 is preferable particularly in a case in which the semiconductor laser array in which the fill factor F.F. shown in Eq. (22) falls within the range of 0.5 to 1 is used as the light source 30.

As previously explained, because in the collimated light generating apparatus according to Embodiment 3 the light source is an array-type light source in which the fill factor F.F. determined from the light emitting width W of each of the plural light emitting points and the pitch P between the light emitting points satisfies 0.5≤F.F.<1, the collimated light generating apparatus can further satisfy the needs for downsizing, small divergence angle, and high degree of efficiency of light utilization.

It is to be understood that any combination of two or more of the embodiments can be made, various modifications can be made to any component in the embodiments, and any component in the embodiments can be omitted within the scope of the invention.

INDUSTRIAL APPLICABILITY

As described above, since collimated light generating apparatuses according to the present disclosure configured to include a light source that emits light having a divergence angle asymmetrical in two-axis directions included in a plane perpendicular to an optical axis, and a conversion optical system that reduces the divergence angle of light output from the light source, the collimated light generating apparatuses are suitable for use for solid-state lighting using an LED or a laser.

REFERENCE SIGNS LIST 10 lens, 10a optical axis, 11 incidence surface, 12 emitting surface, 20 and 30 light source, 20a and 30a horizontal rays (light beam), 20b and 30b vertical rays (light beam), 20c horizontal light emitting width, 20d vertical light emitting width, 21a internal position, and 21b and 31 facet.

The invention claimed is:

1. A collimated light generating apparatus comprising:
a lens including both an incidence surface having a cylindrical concave shape, and an emergence surface having a convex shape axially symmetric with respect to an optical axis; and
a light source such that divergence angle in a first direction in a plane perpendicular to the optical axis differs from divergence angle in a second direction different from the first direction by 90 degrees, wherein
the light source is placed at a position of incidence-surface-side focal length for the second direction of the lens, and the first direction of the light source is aligned with curvature direction of the cylindrical shape of the lens,
the radius of curvature ($R_{h1}$) in the first direction of the incidence surface, the radius of curvature ($R_{h2}$) in the first direction of the emitting surface, the thickness (d) of the lens, and the refractive index (n) of the lens are designed to satisfy the following relation:

$$R_{h1} - R_{h2} + \frac{n-1}{n}d = 0,$$

and
the focal length f for the second direction, the radius of curvature ($R_{v1}$) in the second direction of the incidence surface, the radius of curvature ($R_{v2}$) in the second direction of the emitting surface, and the thickness (d) of the lens, and the refractive index (n) of the lens are designed to satisfy the following relation:

$$f = \frac{R_{v1} R_{v2}}{(n-1)\left(R_{v1} - R_{v2} + \frac{n-1}{n}d\right)}.$$

2. The collimated light generating apparatus according to claim 1, wherein width of light emitting point of the light source is wider in the first direction than in the second direction.

3. The collimated light generating apparatus according to claim 1, wherein the light source has astigmatic difference.

4. The collimated light generating apparatus according to claim 3, wherein the light source is a semiconductor laser.

5. The collimated light generating apparatus according to claim 1, wherein the light source has plural light emitting points in the first direction.

6. The collimated light generating apparatus according to claim 5, wherein the light source is an array-type light source in which fill factor F.F., which is determined from both light emitting width W of each of the plural light emitting points and pitch P between the light emitting points, satisfies: 0.5≤F.F.<1.

7. The collimated light generating apparatus according to claim 5, wherein the light source is a semiconductor laser array.

* * * * *